(12) United States Patent
Kadatch et al.

(10) Patent No.: US 9,720,952 B2
(45) Date of Patent: Aug. 1, 2017

(54) VIRTUAL BLOCK DEVICES

(71) Applicant: Google Inc., Mountain View, CA (US)

(72) Inventors: Andrew Kadatch, Redmond, WA (US); Sergey Khorun, Seattle, WA (US)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 14/751,037

(22) Filed: Jun. 25, 2015

(65) Prior Publication Data

US 2015/0310056 A1  Oct. 29, 2015

Related U.S. Application Data (63) Continuation of application No. 13/831,219, filed on Mar. 14, 2013, now Pat. No. 9,069,806.

(Continued)

(51) Int. Cl.
  *G06F 17/30* (2006.01)
  *G06F 9/50* (2006.01)
  *G06F 9/455* (2006.01)

(52) U.S. Cl.
  CPC .... *G06F 17/30371* (2013.01); *G06F 9/45558* (2013.01); *G06F 9/5072* (2013.01);
  (Continued)

(58) Field of Classification Search
  CPC ......... G06F 17/30371; G06F 17/30091; G06F 17/30138; G06F 17/30233;
  (Continued)

(56) References Cited

U.S. PATENT DOCUMENTS

| | | |
|---|---|---|
| 5,463,768 A | 10/1995 | Cudihy et al. |
| 5,655,081 A | 8/1997 | Bonnell et al. |

(Continued)

FOREIGN PATENT DOCUMENTS

| | | | |
|---|---|---|---|
| WO | 2011/095516 | 8/2011 | |
| WO | WO 2012/148447 | * 11/2012 | ............. G06F 12/08 |

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

*Primary Examiner* — Robert Stevens
(74) *Attorney, Agent, or Firm* — Fish & Richardson P.C.

(57) ABSTRACT

Methods, systems, and apparatus, including computer programs encoded on a computer storage medium, for virtual block storage. In one aspect, a method includes receiving a request to initialize a virtual machine, the virtual machine having an associated virtual block device; accessing a file map comprising a plurality of file map entries; determining file map entries corresponding to blocks of data allocated to the virtual block device and one or more files in which the blocks of data allocated to the virtual block device are stored; determining that a particular one of the blocks allocated to the virtual block device has been written to a new position not associated with the particular block in the file map; and updating the position associated with the particular block to the new position.

20 Claims, 5 Drawing Sheets

Related U.S. Application Data (60) Provisional application No. 61/616,322, filed on Mar. 27, 2012.

(52) U.S. Cl.
CPC .. *G06F 17/30091* (2013.01); *G06F 17/30138* (2013.01); *G06F 17/30233* (2013.01); *G06F 17/30303* (2013.01); *G06F 2009/4557* (2013.01)

(58) Field of Classification Search
CPC ........... G06F 17/30303; G06F 9/45558; G06F 9/5072; G06F 2009/4557
USPC .......................................................... 718/1
See application file for complete search history.

(56) References Cited

U.S. PATENT DOCUMENTS

| | | |
|---|---|---|
| 5,778,444 A | 7/1998 | Langan et al. |
| 5,881,311 A | 3/1999 | Woods |
| 6,014,724 A | 1/2000 | Jenett |
| 6,178,482 B1 | 1/2001 | Sollars |
| 6,505,211 B1 | 1/2003 | Dessloch et al. |
| 6,505,248 B1 | 1/2003 | Casper et al. |
| 6,598,179 B1 | 7/2003 | Chirashnya et al. |
| 6,643,613 B2 | 11/2003 | McGee et al. |
| 6,898,697 B1 | 5/2005 | Gao et al. |
| 6,931,450 B2 | 8/2005 | Howard et al. |
| 6,996,502 B2 | 2/2006 | De La Cruz et al. |
| 7,043,455 B1 | 5/2006 | Cuomo et al. |
| 7,062,718 B2 | 6/2006 | Kodosky et al. |
| 7,117,243 B2 | 10/2006 | Peart |
| 7,155,586 B1 | 12/2006 | Wagner et al. |
| 7,293,154 B1 | 11/2007 | Karr et al. |
| 7,356,679 B1 | 4/2008 | Le et al. |
| 7,409,511 B2 | 8/2008 | Edwards et al. |
| 7,466,703 B1 | 12/2008 | Arunachalam et al. |
| 7,478,388 B1 | 1/2009 | Chen et al. |
| 7,500,262 B1 | 3/2009 | Sanin et al. |
| 7,529,836 B1 | 5/2009 | Bolen et al. |
| 7,533,229 B1 | 5/2009 | van Rietschote |
| 7,596,620 B1 | 9/2009 | Colton et al. |
| 7,650,331 B1 | 1/2010 | Dean et al. |
| 7,653,833 B1 | 1/2010 | Miller et al. |
| 7,657,578 B1 | 2/2010 | Karr et al. |
| 7,761,573 B2 | 7/2010 | Travostino et al. |
| 7,804,862 B1 | 9/2010 | Olson et al. |
| 7,836,285 B2 | 11/2010 | Giri et al. |
| 8,065,717 B2 | 11/2011 | Band |
| 8,103,771 B2 | 1/2012 | Tanaka et al. |
| 8,108,903 B2 | 1/2012 | Norefors et al. |
| 8,146,147 B2 | 3/2012 | Litvin et al. |
| 8,151,033 B2 | 4/2012 | Dake |
| 8,261,295 B1 | 9/2012 | Risbood et al. |
| 8,276,140 B1 | 9/2012 | Beda et al. |
| 8,290,994 B2 | 10/2012 | Allalouf et al. |
| 8,578,083 B2 | 11/2013 | Chandrasekaran et al. |
| 8,677,449 B1 | 3/2014 | Beda |
| 8,745,329 B2 | 6/2014 | Kadatch et al. |
| 8,800,009 B1 | 8/2014 | Beda et al. |
| 8,812,586 B1 | 8/2014 | Kulkarni et al. |
| 8,813,240 B1 | 8/2014 | Northup |
| 8,874,888 B1 | 10/2014 | Beda, III et al. |
| 8,909,939 B1 | 12/2014 | Beda et al. |
| 8,958,293 B1 | 2/2015 | Anderson |
| 8,983,860 B1 | 3/2015 | Beda et al. |
| 8,996,887 B2 | 3/2015 | Kadatch et al. |
| 9,063,818 B1 | 6/2015 | Risbood et al. |
| 9,069,616 B2 | 6/2015 | Kadatch et al. |
| 9,069,806 B2 | 6/2015 | Kadatch et al. |
| 2002/0091902 A1 | 7/2002 | Hirofuji |
| 2004/0139368 A1 | 7/2004 | Austen et al. |
| 2005/0010715 A1 | 1/2005 | Davies et al. |
| 2005/0166011 A1 | 7/2005 | Burnett et al. |
| 2006/0020744 A1 | 1/2006 | Sinclair et al. |
| 2006/0059228 A1 | 3/2006 | Kasamsetty et al. |
| 2006/0098618 A1 | 5/2006 | Bouffioux |
| 2006/0136676 A1 | 6/2006 | Park et al. |
| 2006/0161753 A1 | 7/2006 | Aschoff et al. |
| 2007/0112956 A1 | 5/2007 | Chapman et al. |
| 2007/0118694 A1 | 5/2007 | Watanabe et al. |
| 2007/0123276 A1 | 5/2007 | Parker et al. |
| 2007/0177198 A1 | 8/2007 | Miyata |
| 2007/0199058 A1 | 8/2007 | Baumgart et al. |
| 2007/0271604 A1 | 11/2007 | Webster et al. |
| 2007/0280243 A1 | 12/2007 | Wray et al. |
| 2007/0288921 A1 | 12/2007 | King et al. |
| 2008/0086515 A1 | 4/2008 | Bai et al. |
| 2008/0205415 A1 | 8/2008 | Morales |
| 2008/0215796 A1 | 9/2008 | Lam et al. |
| 2008/0222246 A1 | 9/2008 | Ebling et al. |
| 2008/0244471 A1 | 10/2008 | Killian et al. |
| 2008/0270704 A1 | 10/2008 | He et al. |
| 2009/0097657 A1 | 4/2009 | Scheidt et al. |
| 2009/0150629 A1 | 6/2009 | Noguchi et al. |
| 2009/0199177 A1 | 8/2009 | Edwards et al. |
| 2009/0222815 A1 | 9/2009 | Dake |
| 2009/0241108 A1 | 9/2009 | Edwards et al. |
| 2009/0249440 A1 | 10/2009 | Platt et al. |
| 2009/0276771 A1 | 11/2009 | Nickolov et al. |
| 2009/0300605 A1 | 12/2009 | Edwards et al. |
| 2009/0313503 A1 | 12/2009 | Atluri et al. |
| 2010/0017859 A1 | 1/2010 | Kelly |
| 2010/0057913 A1 | 3/2010 | DeHaan |
| 2010/0071035 A1 | 3/2010 | Budko et al. |
| 2010/0094847 A1 | 4/2010 | Malan et al. |
| 2010/0095000 A1 | 4/2010 | Kettler et al. |
| 2010/0153617 A1 | 6/2010 | Miroshnichenko et al. |
| 2010/0199089 A1 | 8/2010 | Vysogorets et al. |
| 2010/0212004 A1 | 8/2010 | Fu |
| 2010/0217927 A1 | 8/2010 | Song |
| 2010/0228903 A1 | 9/2010 | Chandrasekaran et al. |
| 2010/0257331 A1* | 10/2010 | Frank ................ G06F 9/5022 711/166 |
| 2010/0287548 A1 | 11/2010 | Zhou et al. |
| 2010/0299667 A1* | 11/2010 | Ahmad .............. G06F 12/1018 718/1 |
| 2010/0306445 A1 | 12/2010 | Dake |
| 2011/0022812 A1 | 1/2011 | van der Linden et al. |
| 2011/0055361 A1 | 3/2011 | DeHaan |
| 2011/0078363 A1 | 3/2011 | Yeh et al. |
| 2011/0085563 A1 | 4/2011 | Kotha et al. |
| 2011/0103389 A1 | 5/2011 | Kidambi et al. |
| 2011/0153838 A1 | 6/2011 | Belkine et al. |
| 2011/0191485 A1 | 8/2011 | Umbehocker |
| 2011/0231280 A1 | 9/2011 | Farah |
| 2011/0258441 A1 | 10/2011 | Ashok et al. |
| 2012/0011176 A1 | 1/2012 | Aizman |
| 2012/0079229 A1 | 3/2012 | Jensen et al. |
| 2012/0089650 A1 | 4/2012 | Gibbs et al. |
| 2012/0185688 A1 | 7/2012 | Thornton |
| 2012/0191912 A1 | 7/2012 | Kadatch et al. |
| 2012/0215050 A1 | 8/2012 | Hu |
| 2012/0233678 A1 | 9/2012 | Pal |
| 2012/0233705 A1 | 9/2012 | Boysen et al. |
| 2012/0246637 A1 | 9/2012 | Kreeger et al. |
| 2012/0266159 A1 | 10/2012 | Risbood et al. |
| 2013/0227552 A1 | 8/2013 | Reddin et al. |

OTHER PUBLICATIONS

Primet, Pascale, et al.., "HIPCAL: State of the Art of OS and Network virtualization solutions for Grids", Sep. 14, 2007, 38 pages.

Wikipedia, "IPSec", [online] [retrieved on Jan. 4, 2011]. Retrieved from the Internet: <URL: http://en.wikipedia.org/wiki/IPsec/>, 8 pages.

Abdull, AlastairIrvine, et al. "Generic Routing Encapsulation", [online] [retrieved on Jan. 4, 2011]. Retrieved from the Internet: <URL: http://creativecommons.org/licenses by-sa/3.0/>, 5 pages.

Farinacci et al., "RFC 2784: Generic Routing Encapsulation (GRE)", Mar. 2000, The Internet Society, 10 pages.

(56) References Cited

OTHER PUBLICATIONS

Kent et al., "RFC 4301: Security Architecture for the Internet Protocol", Dec. 2005, The Internet Society, 102 pages.
Wikipedia, "Domain Name System". [online] [Retrieved on Feb. 4, 2012]. Retrieved from the Internet: <URL: http://en.wikipedia.org/wiki/Domain_Name_System>, 16 pages.
Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.
Wikipedia. "OAuth." [online] [Retrieved on Jan. 20, 2011]. Retrieved from the Internet <URL: http://en.wikipedia.org/wiki/OAuth>, 3 pages.
Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
Travostino, Franco, et al., Seamless Live Migration of Virtual Machines over the MAN/WAN, 2006, Elsevier Future Generation Computer Systems 2006, 10 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.

OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling-Getting Started Guide—API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch-Developer Guide—API Version Aug. 1, 2010. Amazon Web Services LLC, 2010, 75 pages.
Benincosa. "Ganglia and Nagios, Part 2: Monitor enterprise clusters with Nagios-Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: < http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
"IPsec". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/ >, pp. 1-8.
"Generic Routing Encapsulation". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/ >, pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.
L. Gommans, et al., Token-Based Authorization of Connection Oriented Network Resources, 1st International Workshop on Networks for Grid Applications (GridNets 2004), Oct. 29, 2004; 8 pages.
Hyun, Ahn Ji, Authorized Officer for Korean Intellectual Property Office, International Search Report and Written Opinion for PCT/US2012/021846, International Search Report completed May 25, 2012, 8 pages.

(56) References Cited

OTHER PUBLICATIONS

Na, Lee Da, Authorized Officer for Korean Intellectual Property Office, International Search Report and Written Opinion for PCT/US2012/020954, International Search Report completed Aug. 23, 2012, 10 pages.
Alpern, B., "The Jalapeno virtual machine," IBM Systems Journal, Jan. 2000, vol. 39, Issue 1, pp. 211-238.
Bok, Jin Yo, Authorized Officer for Korean Intellectual Property Office, International Search Report and Written Opinion for PCT/US2012/029210, International Search Report completed Oct. 10, 2012, 2 pages.
Cabellos et al., LISPmob: Mobile Networking through LISP, Apr. 2, 2012, 8 pages.
Steinmetz, Christof, Authorized Office for European Patent Office, International Search Report and Written Opinion for PCT/US2013/034140, completed Jun. 25, 2013, 21 pages.
Bin-ell, Andrew, et al., "A Design for High-Performance Flash Disks", ACM SIGOPS Operating Systems Review—Systems work at Microsoft Research, vol. 41, Issue 2, Apr. 2007, pp. 88-93.
Gal, Eran, et al., "Algorithms and Data Structures for Flash Memories", ACM Computing Surveys, vol. 37, No. 2 Jun. 2005, pp. 138-163.
Tweedie, Stephen C., "Workflow", The Fourth Annual Linux Expo, Durham, NC, Apr. 28-30, 1998, pp. 1-8.
Van Hensbergen, Eric, "Paravirtualized File Systems", KVM Forum 2008, Napa Valley, CA, Jun. 11-13, 2008, pp. 1-24.
Murdock, Ian, et al., "SWARM: A Log-Structured Storage System for Linux", Proceedings of the FREENIX Track: 2000 USENIX Annual Technical Conference, San Diego, CA, Jun. 18-23, 2000, 10 pages.

* cited by examiner

VIRTUAL BLOCK DEVICES

CROSS-REFERENCE TO RELATED APPLICATIONS

This is a continuation of U.S. application Ser. No. 13/831,219, filed on Mar. 14, 2013, which claims the benefit under 35 U.S.C. §119(e) of U.S. Provisional Application No. 61/616,322, filed Mar. 27, 2012. The disclosures of the prior applications are considered part of and are incorporated by reference in the disclosure of this application.

BACKGROUND

This specification relates to data storage for virtual machines.

Cloud computing is network-based computing in which typically large collections of servers housed in data centers or "server farms" provides computational resources and data storage as needed to remote end users. Some cloud computing services allow end users to run user-provided server software applications (e.g., e-commerce server applications, web servers, or file servers) in the cloud. Some other cloud computing services provide access to software applications such as word processors and other commonly used applications to end users who utilize the applications through web browsers or other client-side software. Users' electronic data files are usually stored in the server farm rather than on the users' personal computing devices.

SUMMARY

In general, one innovative aspect of the subject matter described in this specification can be embodied in methods that include the actions of receiving a request to initialize a virtual machine, the virtual machine having an associated virtual block device; accessing a file map comprising a plurality of file map entries, each file map entry associating a respective block of data with a respective position within a respective data file to which the block of data was written, wherein each of the plurality of blocks of data is stored in the respective data file in association with metadata that identifies the block of data and a respective sequence number for a write request that resulted in the block being written to the position; determining file map entries corresponding to blocks of data allocated to the virtual block device and one or more files in which the blocks of data allocated to the virtual block device are stored; determining that a particular one of the blocks allocated to the virtual block device has been written to a new position not associated with the particular block in the file map, comprising: scanning one or more positions within the one or more files to determine that the particular block was written to the new position, the new position not being associated with the particular block in the file map, and determining, from a sequence number stored in association with the particular block at the new position, that the particular block was written to the new position subsequent to being written to the position indicated by the file map; and updating the position associated with the particular block to the new position.

Other embodiments of this aspect include corresponding systems, apparatus, and computer programs, configured to perform the actions of the methods, encoded on computer storage devices.

These and other embodiments can each optionally include one or more of the following features. Updating the position associated with the particular block to the new position can include: generating a new file map entry, the new file map entry associating the particular block of data with the new position; and updating the file map with the new file map entry.

The method can further include: receiving a first request from the virtual machine to write a first block of data to the virtual block device; associating metadata with the first block of data, the metadata identifying the first block of data and a sequence number for the first request; submitting a request to a file system to write the block of data and the metadata to a first position within a first file; and generating a first file map entry, the first file map entry associating the first block of data with the first position within the first file.

The method can further include: receiving a request from the virtual machine to read the first block of data from the virtual block device; determining, from the first file map entry, that the first block of data was written to the first position within the first file; and submitting a request to the file system to read the first block of data from the first position within the first file. The method can further include: storing the first file map entry in a local memory.

The method can further include: determining that a predetermined period of time has elapsed subsequent to a previous update of the file map; and updating the file map with the first file map entry. The method can further include: determining that a number of file map entries generated subsequent to a previous update of the file map exceeds a predetermined number; and updating the first file map with the first file map entry.

The sequence number assigned to each request to write a block of data to the virtual block device can be greater than any sequence number assigned to any previous request to write the block of data to the virtual block device. Determining, from the sequence number stored in association with the particular block at the new position, that the particular block was written to the new position subsequent to being written to the position indicated by the file map can include: determining that the sequence number associated with the particular block at the new position is greater than the sequence number associated with the particular block at the position indicated by the file map.

Scanning the one or more positions in the one or more files to determine that the particular block was written to the new position can include: determining that a size of a particular file exceeds a size indicated by metadata associated with the file map for the particular file; and scanning a tail of the particular file to identify blocks allocated to the virtual block device stored in the tail, wherein the tail of the particular file is the portion of the particular file that exceeds the size indicated by the metadata.

Scanning the one or more positions in the one or more files to determine that the particular block was written to the new position can include: scanning one or more positions in the particular file not associated with any block of data in the file map, the one or more positions including the new position; and determining that the particular block of data is stored at the new position in the particular file.

The method can further include: determining that a size of a particular file exceeds a threshold size; and refraining from writing any blocks of data to the particular file. The method can further include: determining, from the sequence numbers associated with blocks of data stored in the particular file, that each of the blocks of data stored in the particular file has been subsequently written to a respective different file; and marking the particular file for deletion.

Particular embodiments of the subject matter described in this document can be implemented so as to realize one or more of the following advantages. Data written to a virtual block device allocated to a virtual machine can be effectively persisted across virtual machine restarts. Data written to a virtual block device allocated to a virtual machine can be preserved in case of hardware failures. Storing data written to a virtual block device on one or more physical block devices accessible over a network can improve disk performance, e.g., because the storage capacity of the physical block devices is not bound by the hardware resources available on the host machine of the virtual machine. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
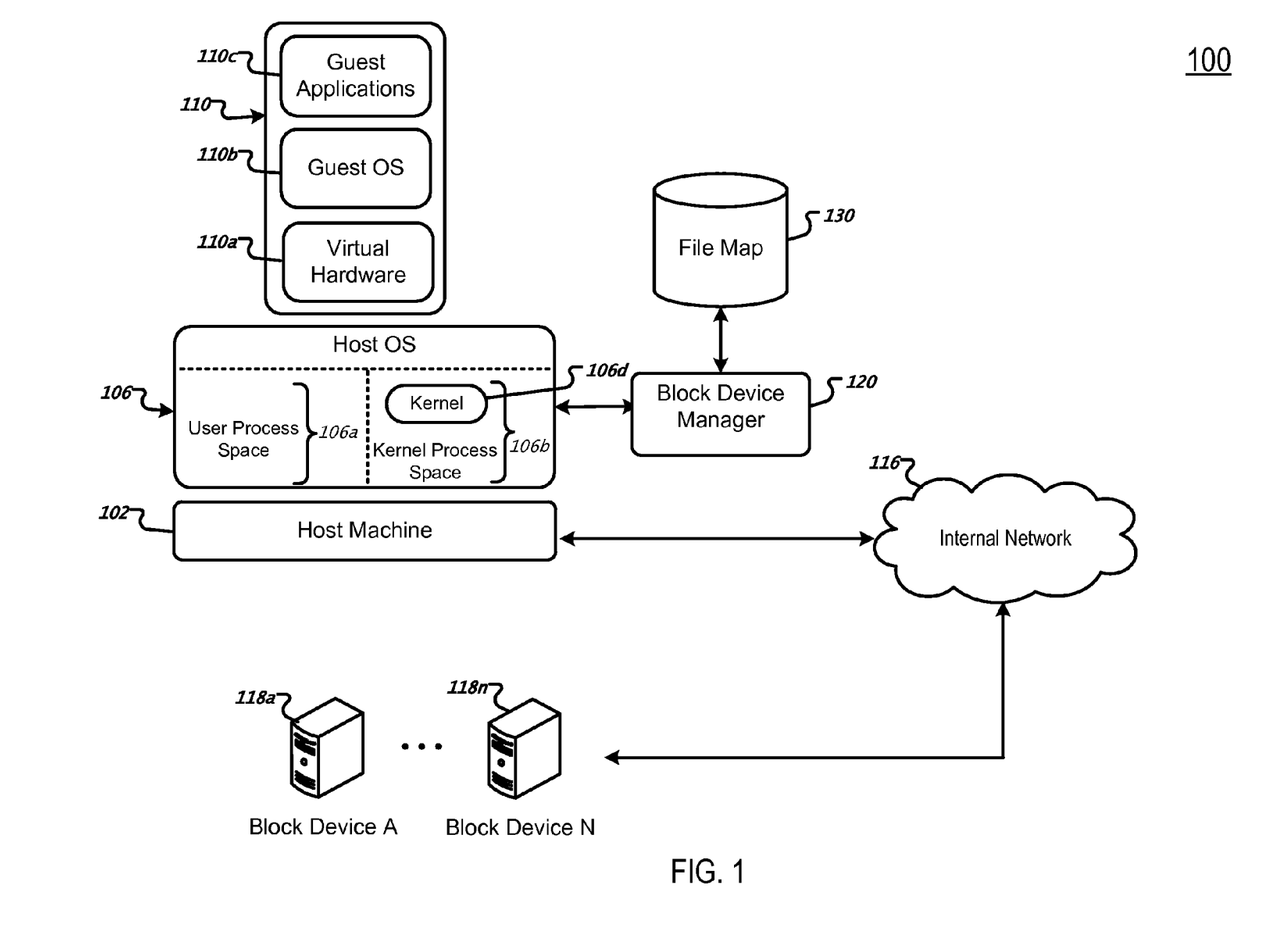
FIG. 1 is a schematic illustration of an example virtual machine system.

FIG. 1 is a schematic illustration of an example virtual machine system 100. The system 100 includes one or more host machines such as, for example, host machine 102. Generally speaking, a host machine is one or more data processing apparatus such as rack mounted servers or other computing devices. The data processing apparatus can be in different physical locations and can have different capabilities and computer architectures. Host machines can communicate with each other through an internal data communications network 116. The internal network 116 can include one or more wired (e.g., Ethernet) or wireless (e.g., WI-FI) networks, for example. In some implementations the internal network 116 is an intranet. Host machines can also communicate with devices on external networks, such as the Internet, through one or more gateways, which are data processing apparatus responsible for routing data communication traffic between the internal network 116 and the external network 122. Other types of external networks are possible.

Host machine 102 executes a host operating system 106 or other software that virtualizes the underlying host machine hardware and manages concurrent execution of one or more virtual machines (e.g., a virtual machine monitor or hypervisor). For example, the host operating system 106 is managing virtual machine (VM) 110. Although not shown in FIG. 1, the host machine 102 can execute a second virtual machine. A VM, such as VM 110, can include a simulated version of the underlying host machine hardware, or a different computer architecture. The simulated version of the hardware is referred to as virtual hardware (e.g., virtual hardware 110a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

A VM's guest software can include a guest operating system (e.g., guest operating systems 110b) which is software that controls the execution of respective guest software applications (e.g., guest applications 110c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

A VM can be allocated a network address through which its guest software can communicate with other processes reachable through the internal network 116 or the Internet. For example, guest software executing on VM 110 can communicate with guest software executing on a second VM. In some implementations, each VM is allocated one or more unique Internet Protocol (IP) version 4 or version 6 addresses and one or more User Datagram Protocol (UDP) port numbers. Other address schemes are possible.

Each VM (e.g., VM 110) is allocated a set of virtual memory pages from the virtual memory of the underlying host operating system and is allocated virtual blocks from one or more virtual block devices for use by the guest software executing on the VM. For example, the host operating system 106 allocates virtual memory pages and virtual blocks to VM 110. In some implementations, a given VM cannot access the virtual memory pages assigned to other VMs. For example, VM 110 cannot access memory pages that have been assigned to a different VM. A virtual block device can be persisted across VM restarts.

Virtual block devices can be virtualized storage devices (e.g., hard drives or RAID arrays). Each virtual block device is organized into one or more virtual blocks. Each virtual block is a predefined amount of data that is accessed as a unit. The size of a virtual block can vary depending on system constraints and requirements. One example size of a virtual block can be 4 Kilobytes. Each virtual block is associated with a respective virtual block number.

Each virtual block device is a collection of physical block devices 118a-118d or a collection of portions of the physical block devices 118a-118d. The physical block devices 118a-118n are coupled to host machines or available over the internal network 116, for example. The physical block devices 118a-118n can be any type of storage device. For example, the physical block devices 118a-118n can be hard drives, network accessible storage devices, RAID arrays, etc. Similar to the virtual block devices, each physical block device 118a-118n can be organized into one or more physical blocks. Each physical block can be a predefined amount of data that is accessed as a unit. The size of a physical block can vary depending on system constraints and requirements. One example size of a physical block can be 4 Kilobytes. In some implementations, the size of a physical block is equal to the size of the virtual block. Each physical block is associated with a physical block number (e.g. a logical block number) that indicates a relative position of the physical block with respect to the storage device on which the physical block is located. The physical blocks on a physical block device 118 can be organized in ascending block number.

Access to the physical block devices 118-118*n* is managed by a file system. For example, the file system can manage requests to read data from the physical block devices 118*a*-118*n* and requests to write data to the physical block devices 118*a*-118*n*. The file system can be any type of file system that can manage the physical block devices 118*a*-118*n*. For example, the file system can be a distributed file system, a NTFS file system, etc.

By way of illustration, and with reference to virtual machine 110, when the guest application 110*c* or guest operating system 110*b* attempts to perform an input/output operation on a virtual disk, initiate network communication, or perform a privileged operation, for example, the virtual hardware 110*a* is interrupted so that the host operating system 106 can perform the action on behalf of the virtual machine 110. The host operating system 106 can perform these actions with a process that executes in kernel process space 106*b*, user process space 106*a*, or both. Alternatively, the host operating system 106 can perform the actions by sending a request to a process that executes on a separate data processing apparatus.

The kernel process space 106*b* is virtual memory reserved for the host operating system's kernel 106*d* which can include kernel extensions and device drivers, for instance. The kernel process space has elevated privileges (sometimes referred to as "supervisor mode"); that is, the kernel 106*d* can perform certain privileged operations that are off limits to processes running in the user process space 106*a*. Examples of privileged operations include access to different address spaces, access to special functional processor units in the host machine such as memory management units, and so on. The user process space 106*a* is a separate portion of virtual memory reserved for user mode processes. User mode processes cannot perform privileged operations directly.

For example, when the guest application 110*c* or guest operating system 110*b* attempts to perform an input/output operation on a virtual block device, e.g., attempts to initiate a write to or a read from the virtual block device, the virtual hardware 110*a* is interrupted so that the host operating system 106 can perform the action on behalf of the virtual machine 110 using a block device manager 120. The block device manager 120 can be executed by the host machine 102 as part of the kernel process space 106*b* or the user process space 106*a*. Alternatively, the block device manager 120 can execute on a separate data processing apparatus. The block device manager 120 can be part of or in communication with the file system that manages the physical block devices 118*a*-118*n*.

The block device manager 120 receives requests from the virtual machine 110 to communicate with virtual block devices allocated to the virtual machine 110. For example, the requests can include requests to read or write one or more virtual blocks of data allocated to the virtual machine 110. The block device manager can have access to a file map 130 that can include data (e.g. file map entries) that map the virtual blocks of data to locations in files maintained by the file system. The locations in files can be used by the file system to read the physical block of data that corresponds to the virtual block of data from one of the physical block devices 118*a*-118*n*.

Figure 2A:
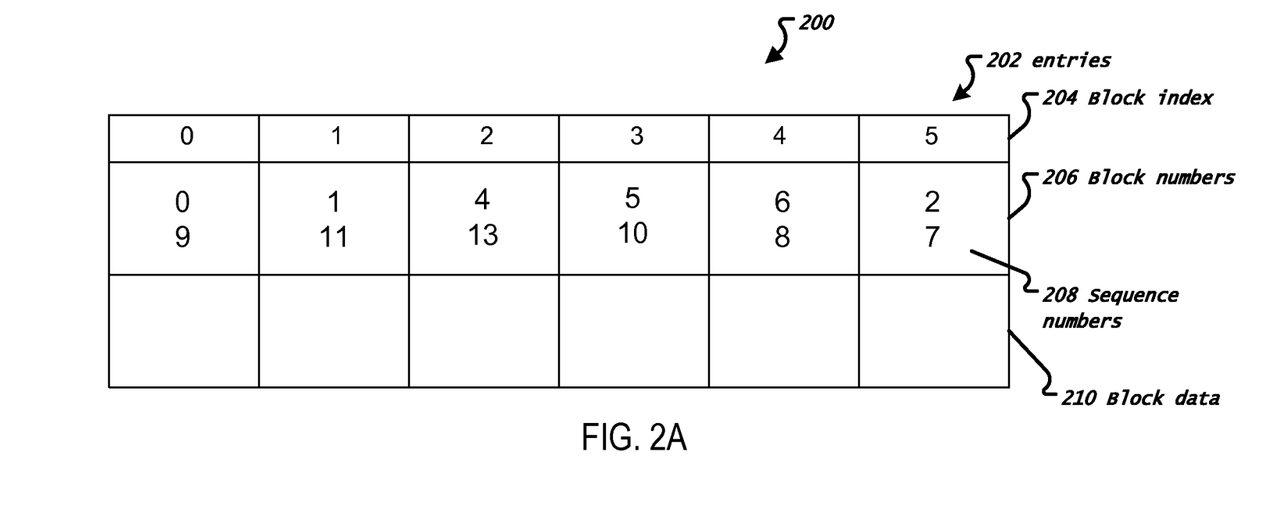
FIG. 2A illustrates an example data file.

FIG. 2A illustrates an example data file 200. The data file 200 is an example of one of a group of data files that are maintained by a file system and that are used by the file system to identify the physical block devices where physical blocks of data that correspond to virtual blocks of data are stored. The data file 202 includes data location entries 202. Each data location entry corresponds to an instance of a write of a respective virtual block of data, e.g., the data location entries can be generated in response to a request to write virtual blocks of data. That is, the file system can generate a separate data location entry for each write request received by the file system. Thus, two different instances of a write of a particular virtual block correspond to two different data location entries which may be included in the same data file or in different data files.

Each data location entry 202 includes a block index 204 and a block number 206. The block index 204 identifies the position of the entry within the data file 200. The block number 206 identifies a physical block that stores the data stored at that entry. Each entry 202 is also associated with a sequence number 208. The sequence numbers 208 are assigned by a block device manager, e.g., block device manager 120 of FIG. 1, and can be monotonically increasing, e.g., so that an entry that was generated at a later time always has a larger sequence number than an entry assigned at a later time. In some implementations, the sequence numbers 208 are metadata associated with the entries 202. For example, the sequence numbers 208 can be included in a data header associated with the entry 202. The data files can also optionally include other metadata, e.g., format version numbers, checksums, encryption information, authentication tags, and so on. Each data location entry 202 also includes block data 210, e.g., the version of the virtual block of data requested to be written to the data location file. In some implementations, the block data 210 is encrypted.

When the file system receives a request to write a block of data to the data file 200, the file system can generate a new data location entry for the block of data that is being written. The file system can then append the new data location entry to the end of the data file 202, e.g., store the new data location entry at a new block index 6 at the end of data file 202.

In some implementations, the file system can also replace an existing data location entry with the new data location entry. In these implementations, each data location entry can be stored in association with an indicator that indicates whether the data location entry is active or inactive. An active data location entry is a data location entry that stores a current version of a block of data. Whether a data location entry is active or inactive can be determined from the sequence number associated with each entry. For example, if two data location entries represent different instances of the same virtual block, the data location entry with the larger sequence number can be denoted as active and the data location entry with the smaller sequence number can be denoted as inactive. Data location entries that are stored in association with an indicator that indicates that the entries are inactive are candidates to be replaced by a new data location entry, e.g., because they store data that is out of date and therefore does need to be maintained.

Figure 2B:
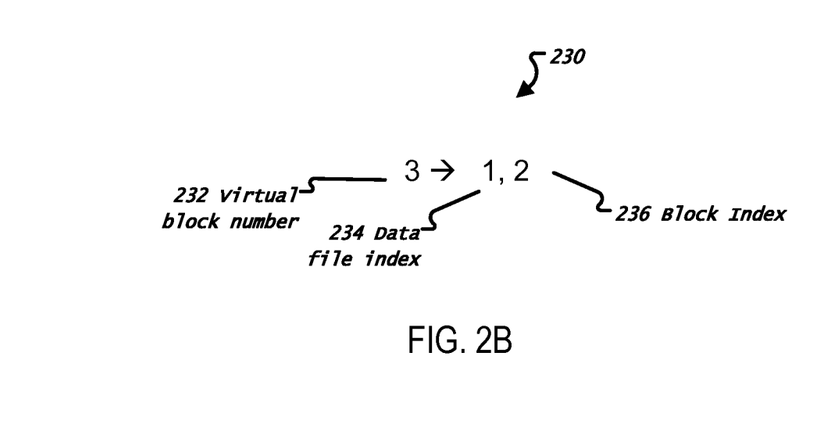
FIG. 2B illustrates an example file map entry.

FIG. 2B illustrates an example file map entry 230. The file map entry 230 is a portion of a file map, e.g., file map 130 of FIG. 1. The file map is used by a block device manager, e.g., block device manager 120 of FIG. 1, to identify the positions within data files where instances of virtual blocks are stored. The file map entry 230 maps a virtual block number 232 to a data file index 234 and a block index 236, i.e., a position within the data file 234. Therefore, by accessing the file map entry 230, the block device manager can determine that virtual block number 3 is stored in data file 1 at a block index 2.

The block device manager can generate the file map entry 230 in response to receiving a request from a virtual machine to write virtual block number 3. Once the file map entry 230 is generated, the block device manager can store the file map entry in a local memory. When particular updating criteria are met, the block device manager can update the file map with the new file map entry. For example, the block device manager can update the file map with file map entries at predetermined time intervals, after a predetermined quantity of data has been written, or after a predetermined number of new file map entries have been generated. When updating the file map, the block device manager can delete any file map entries corresponding to previous instances of virtual block number 3, e.g., because they refer to versions of virtual block number 3 that are now out of date.

Thus, because file map entries are stored in volatile memory for a period of time before being written to persistent storage, e.g., the file map, hardware or software failures may cause the file map to be out of date with respect to where the current version of a particular virtual block of data is stored.

Figure 3:
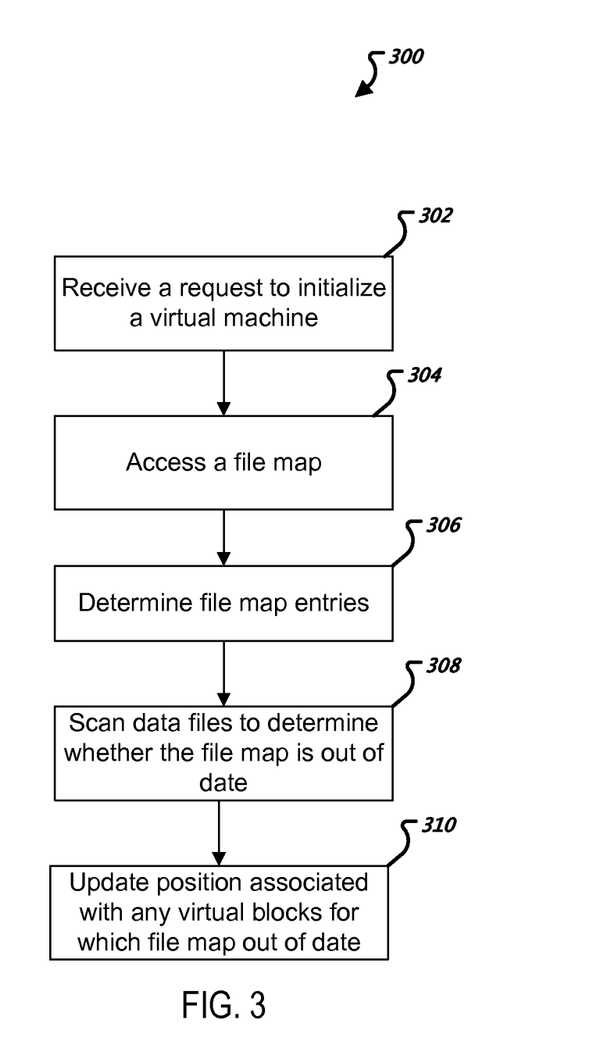
FIG. 3 is a flow diagram of an example technique for determining whether a file map is up to date.

FIG. 3 is a flow diagram of an example technique 300 for determining whether a file map is up to date. For convenience, the technique 300 will be described with respect to a system of data processing apparatus located in one or more locations that performs the technique 300. For example, a block device manager, e.g., block device manager 120 of FIG. 1, can be used to perform the technique 300.

The system receives a request to initialize a virtual machine (step 302). When the virtual machine is initialized, the virtual machine is allocated, e.g., by the host operating system of the virtual machine, one or more virtual blocks of data on one or more virtual block devices.

The system accesses a file map (step 304). The file map includes file map entries that each associate a respective virtual block of data with a position in a data file maintained by a file system.

The system determines, from the map, the file map entries that correspond to the virtual blocks allocated to the virtual machine (step 306). For example, the system can access metadata associated with the virtual block devices associated with the virtual machine. The metadata identifies which entries in the file map correspond to the virtual blocks allocated to the virtual block devices. In some implementations, the metadata identifies segments of the file map that contain file map entries that correspond to the virtual blocks allocated to the virtual block devices.

The metadata can also indicate, e.g., the current sequence number to be assigned to the next write request received from the virtual machine. The system can load those portions of the map that include the relevant file map entries into a local memory for use in processing future read requests received from the virtual machine. Processing a read request received from a virtual machine is described in more detail below with reference to FIG. 5.

The system scans data files to determine whether the file map is out of date with respect to the virtual blocks allocated to the virtual machine (step 308). That is, the system can scan the data files to determine if any of the virtual blocks have been written to a new position not indicated in the file map, e.g., at a time subsequent to the last file map update.

In implementations where the new data location entries can only be appended to the end of data files, the system can scan only data files whose size exceeds the size indicated by the file map. In order to determine the size of the files, the system can access metadata associated with the file map that indicates the size of each data file maintained by the file map. The system can then scan only the tails of the data files whose size is greater than the size indicated by the data associated with the file map, where the tail of a data file is the portion of the file that exceeds the size indicated by the metadata. For example, the metadata may indicate that a particular data file has 5 data location entries at block indexes 0-4, respectively. However, the system may analyze the file and determine that the data file actually has 7 data location entries at block index 0-6, respectively. The system can then scan only the data location entries at the tail of the file, i.e. the data location entries at block indexes 5 and 6.

If, after scanning the data files, the system identifies that any of the virtual blocks allocated to the virtual machine have been written to a position different from those indicated in the file map, the system can compare sequence numbers stored with each data location entry that corresponds to the virtual block. Based on the comparison, the system can determine whether the data location entry not indicated in the file map is the current version of the virtual block, i.e., because it has the largest sequence number.

In implementations where new data location entries can potentially either be appended to the end of data files or replace existing data location entries that are marked as inactive, the system can scan both the tails of the data files whose size is greater than the size indicated by the data associated with the file map and the previously inactive positions in the data files to determine whether any data location entries not indicated in the file map are the current version of one of the virtual blocks allocated to the virtual machine.

The system may determine which locations are inactive in a given data file from the file map. That is, the system can determine, from the file map, the positions within the given data file that are associated with a virtual block. The system can then scan each position within the given data file that is not associated with any virtual blocks, e.g., because those positions are candidates to have been written to subsequent to the last update of the file map. For each of those positions, if a version of one of the virtual blocks allocated to the virtual machine has been written to the position subsequent to the last update, the system determines whether the version is the current version of the virtual block, e.g., as described above. If the version is current, the system also scans the position previously indicated as the current position for that virtual block in the file map, e.g., because subsequent to writing the new version that is not reflected in the file map, the previously indicated current position may have been marked as inactive and replaced with a new data location entry. The system can continue scanning each previously indicated position until the previously indicated position stores a version of a virtual block that is older than the current version of the virtual block.

For example, the metadata associated with a particular data file may indicate that the file has 5 data location entries at block indexes 0-4, respectively. The file map may indicate that data locations entries corresponding to the current versions of virtual blocks 0, 1, and 2 are stored at block index 0, 2, and 3, respectively, within the data file. The system can then scan block index 1 and 4, because those block indices are not associated with a virtual block in the file map. If the system scans block index 1 and determines that a data location entry corresponding to a version of block 1 is stored at block index 1, the system can determine whether the data location entry stored at block index 1 is current, e.g., by comparing the sequence numbers associated with each data location entry. If the data location entry stored at block index 1 is current, the system can scan block index 2, e.g., because the data location entry stored at block index 2 may have been marked as inactive and replaced by a new data location entry after a newer version of virtual block 1 was written to block index 1.

The system can update the position associated with any virtual blocks for which the file map is out of date (step 310). That is, the system can create a file map entry that associates the virtual block with the data location entry that corresponds to the current version of the virtual block if such a file map entry is not already included in the file map.

In some implementations, if the system receives a request to read a particular virtual block before the technique 300 is completed, e.g., before the system determines whether the file map is out of date with respect to any of the virtual blocks allocated to the virtual machine, the system can pause execution of the request until the technique 300 is completed in order to prevent a potentially out of date version of the particular virtual block from being returned to the virtual machine.

Figure 4:
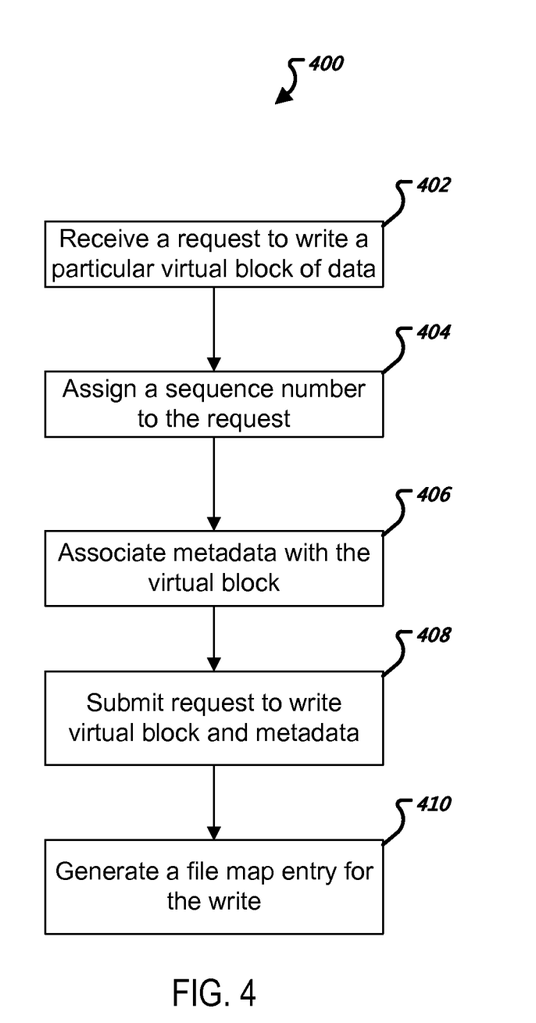
FIG. 4 is a flow diagram of an example technique for processing a write request received from a virtual machine.

FIG. 4 is a flow diagram of an example technique 400 for processing a write request received from a virtual machine. For convenience, the technique 400 will be described with respect to a system of data processing apparatus located in one or more locations that performs the technique 400. For example, a block device manager, e.g., block device manager 120 of FIG. 1, can be used to perform the technique 400.

The system receives a request from a virtual machine to write a particular virtual block of data to a virtual block device (step 402). For example, the host operating system for the virtual machine can interrupt the virtual hardware of the virtual machine and submit a request to the system to perform the write on behalf of the virtual machine.

The system assigns a sequence number to the write request (step 404). The sequence number is assigned such that the sequence number for the current write request is greater than any previous request to write the particular virtual block of data. For example, as described above, the sequence numbers can be monotonically increasing.

The system associates metadata with the particular virtual block (step 406). The metadata can include an identifier for the virtual block, e.g., the virtual block number for the block, and the sequence number for the write request.

The system submits a request to a file system to write the virtual block of data and the metadata to a particular position within a particular file maintained by the file system (step 408). For example, the system can submit a request to the file system to generate a data location entry for the virtual block of data within the particular file at a particular block index.

The system generates a file map entry for the write (step 410). The file map entry associates the virtual block with the particular file and the particular position within the file, e.g., the block index. The system can store the file map entry in a local memory. When particular updating criteria are met, the system can update the file map with the new file map entry. For example, the system can update the file map with file map entries at predetermined time intervals, after a predetermined quantity of data has been written, or after a predetermined number of new file map entries have been generated. The system can then use the file map entry in responding to subsequent requests to read from the particular virtual block.

In some implementations, after submitting the write request to the file system, the system can identify any previous instances of the virtual block that are stored in other positions in data files maintained by the file system. The system can then associate the data location entries associated with those requests with an indicator that indicates that those data location entries are inactive and can be, e.g., replaced with new data location entries by the file system.

Figure 5:
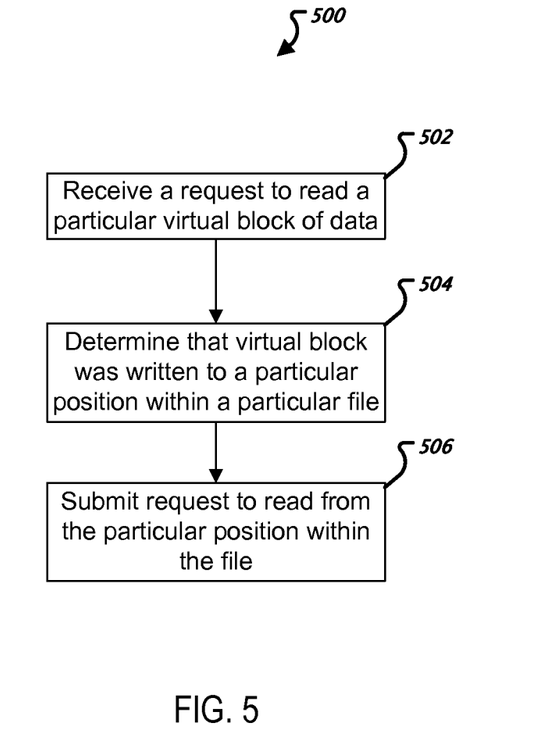
FIG. 5 is a flow diagram of an example technique for processing a read request received from a virtual machine.

FIG. 5 is a flow diagram of an example technique 500 for processing a read request received from a virtual machine. For convenience, the technique 500 will be described with respect to a system of data processing apparatus located in one or more locations that performs the technique 500. For example, a block device manager, e.g., block device manager 120 of FIG. 1, can be used to perform the technique 500.

The system receives a request from a virtual machine to read a virtual block of data from a virtual block device (step 502). For example, the host operating system for the virtual machine can interrupt the virtual hardware of the virtual machine and submit a request to the system to perform the read on behalf of the virtual machine.

The system can determine that the virtual block of data was written to a particular position within a particular data file (step 504). For example, the system can access a set of file map entries stored in local memory to identify the file map entry that corresponds to the virtual block of data. The file map entry associates the virtual block of data with the particular position within the particular data file.

The system can submit a request to a file system to read the virtual block of data from the particular position within a particular data file (step 506). In turn, the file system can use the information stored at that particular position within the particular data file to read the virtual block from the one or more physical block devices in which the corresponding physical block is stored.

In some implementations, it may desirable that none of the data files have a size that exceeds a predetermined threshold size. In these implementations, the block device manager can periodically determine whether any of the data files exceed the predetermined threshold size. For example, the block device manager can make this determination after submitting a request to the file system to write to or read from the data file. Alternatively, the block device manager can check the size of the data files as part of a separate process.

If a data file exceeds the threshold size, the block device manager can associate metadata with the file that indicates that the file is "finalized" and refrain from submitting further requests to write to the file. For each finalized file, the block device manager can periodically determine whether any of the data location entries stored are active entries, i.e., whether they refer to the current version of a virtual block. Whether a data location entry is active can be determined from the sequence number associated with the entry. For example, if two data location entries represent different instances of the same virtual block, the data location entry with the larger sequence number can be associated as active and the data location entry with the smaller sequence number can be denoted as inactive. If none of the data location entries in a finalized data file are active, the block device manager can delete the file or mark the file for deletion by another system.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor can receive instructions and data from a read-only memory or a random access memory or both. The essential elements of a computer are a processor for performing actions in accordance with instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a television with one or more processors embedded therein or coupled thereto, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    receiving a request to initialize a virtual machine, the virtual machine having an associated persistent virtual block device, wherein the persistent virtual block device is realized using a plurality of data files maintained by a file system and a persistent file map comprising a plurality of file map entries, each file map entry associating a respective block of the virtual block device with a respective position within a respective data file maintained by the file system to which the block was written, and wherein each of the blocks is written to the respective data file in association with metadata that identifies the block; and
    initializing the file map for use by the virtual machine, wherein initializing the file map for use by the virtual machine comprises determining whether the file map is up to date with respect to the file system for each of the blocks of the persistent virtual block device identified in the file map, comprising:
        determining that the file map indicates that a particular data file of the plurality of data files maintained by the file system has one or more unused positions that are not associated with any virtual blocks;
        scanning the one or more unused positions in the particular data file;
        identifying, from the scanning, that a new version of a particular block that is associated with an initial position in the file map has been written to a new position in the one or more unused positions of the particular data file;
        determining that the particular block was written to the new position subsequent to being written to the initial position indicated by the file map; and
        updating the position associated with the particular block in the file map to the new position.

2. The method of claim 1, wherein updating the position associated with the particular block to the new position comprises:
    generating a new file map entry, the new file map entry associating the particular block of data with the new position; and
    updating the file map with the new file map entry.

3. The method of claim 1, further comprising:
    receiving a first request from the virtual machine to write a first block of data to the virtual block device;
    associating metadata with the first block of data, the metadata identifying the first block of data and a sequence number for the first request;
    submitting a request to the file system to write the block of data and the metadata to a first position within a first file; and
    generating a first file map entry, the first file map entry associating the first block of data with the first position within the first file.

4. The method of claim 3, further comprising:
    receiving a request from the virtual machine to read the first block of data from the virtual block device;
    determining, from the first file map entry, that the first block of data was written to the first position within the first file; and
    submitting a request to the file system to read the first block of data from the first position within the first file.

5. The method of claim 3, further comprising:
    storing the first file map entry in a local memory.

6. The method of claim 5, further comprising:
    determining that a predetermined period of time has elapsed subsequent to a previous update of the file map; and
    updating the file map with the first file map entry.

7. The method of claim 5, further comprising
    determining that a number of file map entries generated subsequent to a previous update of the file map exceeds a predetermined number; and
    updating the first file map with the first file map entry.

8. The method of claim 1, wherein each of the blocks is written to the respective data file in association with a respective sequence number for a write request that resulted in the block being written to the corresponding position, and wherein the sequence number assigned to each request to write a block of data to the virtual block device is greater than any sequence number assigned to any previous request to write the block of data to the virtual block device.

9. The method of claim 8, wherein determining that the particular block was written to the new position subsequent to being written to the initial position comprises:
determining that a sequence number associated with the particular block at the new position is greater than a sequence number associated with the particular block at the initial position.

10. The method of claim 1, wherein determining whether the file map is up to date with respect to the file system further comprises:
determining that a size of a second file of the plurality of data files maintained by the file system exceeds a size indicated by metadata associated with the file map for the second file;
scanning a tail of the second file to identify blocks allocated to the virtual block device written to the tail of the second file, wherein the tail of the second file is the portion of the second file that exceeds the size indicated by the metadata;
identifying, from the scanning of the tail of the second file, that a new version of a second block that is associated with an initial second position in the file map has been written to a new second position in the tail of the second file;
determining that the second block was written to the new second position subsequent to being written to the initial second position indicated by the file map; and
updating the position associated with the second block in the file map to the new position.

11. The method of claim 1, further comprising:
determining that a size of the particular file exceeds a threshold size; and
refraining from writing any blocks of data to the particular file.

12. The method of claim 11, further comprising:
determining, from sequence numbers associated with blocks of data stored in the particular file, that each of the blocks of data stored in the particular file has been subsequently written to a respective different file; and
marking the particular file for deletion.

13. A system comprising one or more data processing apparatus and one or more storage devices storing instructions that when executed by the one or more data processing apparatus cause the one or more data processing apparatus to perform operations comprising:
receiving a request to initialize a virtual machine, the virtual machine having an associated persistent virtual block device, wherein the persistent virtual block device is realized using a plurality of data files maintained by a file system and a persistent file map comprising a plurality of file map entries, each file map entry associating a respective block of the virtual block device with a respective position within a respective data file maintained by the file system to which the block was written, and wherein each of the blocks is written to the respective data file in association with metadata that identifies the block; and
initializing the file map for use by the virtual machine, wherein initializing the file map for use by the virtual machine comprises determining whether the file map is up to date with respect to the file system for each of the blocks of the persistent virtual block device identified in the file map, comprising:
determining that the file map indicates that a particular data file of the plurality of data files maintained by the file system has one or more unused positions that are not associated with any virtual blocks;
scanning the one or more unused positions in the particular data file;
identifying, from the scanning, that a new version of a particular block that is associated with an initial position in the file map has been written to a new position in the one or more unused positions of the particular data file;
determining that the particular block was written to the new position subsequent to being written to the initial position indicated by the file map; and
updating the position associated with the particular block in the file map to the new position.

14. The system of claim 13, wherein updating the position associated with the particular block to the new position comprises:
generating a new file map entry, the new file map entry associating the particular block of data with the new position; and
updating the file map with the new file map entry.

15. The system of claim 13, the operations further comprising:
receiving a first request from the virtual machine to write a first block of data to the virtual block device;
associating metadata with the first block of data, the metadata identifying the first block of data and a sequence number for the first request;
submitting a request to the file system to write the block of data and the metadata to a first position within a first file; and
generating a first file map entry, the first file map entry associating the first block of data with the first position within the first file.

16. The system of claim 15, the operations further comprising:
receiving a request from the virtual machine to read the first block of data from the virtual block device;
determining, from the first file map entry, that the first block of data was written to the first position within the first file; and
submitting a request to the file system to read the first block of data from the first position within the first file.

17. The system of claim 13, wherein each of the blocks is written to the respective data file in association with a respective sequence number for a write request that resulted in the block being written to the corresponding position, and wherein the sequence number assigned to each request to write a block of data to the virtual block device is greater than any sequence number assigned to any previous request to write the block of data to the virtual block device.

18. The system of claim 17, wherein determining that the particular block was written to the new position subsequent to being written to the initial position comprises:
determining that a sequence number associated with the particular block at the new position is greater than a sequence number associated with the particular block at the initial position.

19. The system of claim 13, wherein determining whether the file map is up to date with respect to the file system further comprises:
determining that a size of a second file of the plurality of data files maintained by the file system exceeds a size indicated by metadata associated with the file map for the second file;
scanning a tail of the second file to identify blocks allocated to the virtual block device written to the tail of the second file, wherein the tail of the second file is the portion of the second file that exceeds the size indicated by the metadata;

identifying, from the scanning of the tail of the second file, that a new version of a second block that is associated with an initial second position in the file map has been written to a new second position in the tail of the second file;

determining that the second block was written to the new second position subsequent to being written to the initial second position indicated by the file map; and updating the position associated with the second block in the file map to the new position.

20. A computer program product encoded on one or more non-transitory computer storage media, the computer program product comprising instructions that when executed by one or more data processing apparatus cause the one or more data processing apparatus to perform operations comprising:

receiving a request to initialize a virtual machine, the virtual machine having an associated persistent virtual block device, wherein the persistent virtual block device is realized using a plurality of data files maintained by a file system and a persistent file map comprising a plurality of file map entries, each file map entry associating a respective block of the virtual block device with a respective position within a respective data file maintained by the file system to which the block was written, and wherein each of the blocks is written to the respective data file in association with metadata that identifies the block; and initializing the file map for use by the virtual machine, wherein initializing the file map for use by the virtual machine comprises determining whether the file map is up to date with respect to the file system for each of the blocks of the persistent virtual block device identified in the file map, comprising:

determining that the file map indicates that a particular data file of the plurality of data files maintained by the file system has one or more unused positions that are not associated with any virtual blocks;

scanning the one or more unused positions in the particular data file;

identifying, from the scanning, that a new version of a particular block that is associated with an initial position in the file map has been written to a new position in the one or more unused positions of the particular data file;

determining that the particular block was written to the new position subsequent to being written to the initial position indicated by the file map; and updating the position associated with the particular block in the file map to the new position.

* * * * *